C. P. BECHTELLE.
Fertilizer Attachment to Grain-Drills.
No. 215,864.  Patented May 27, 1879.
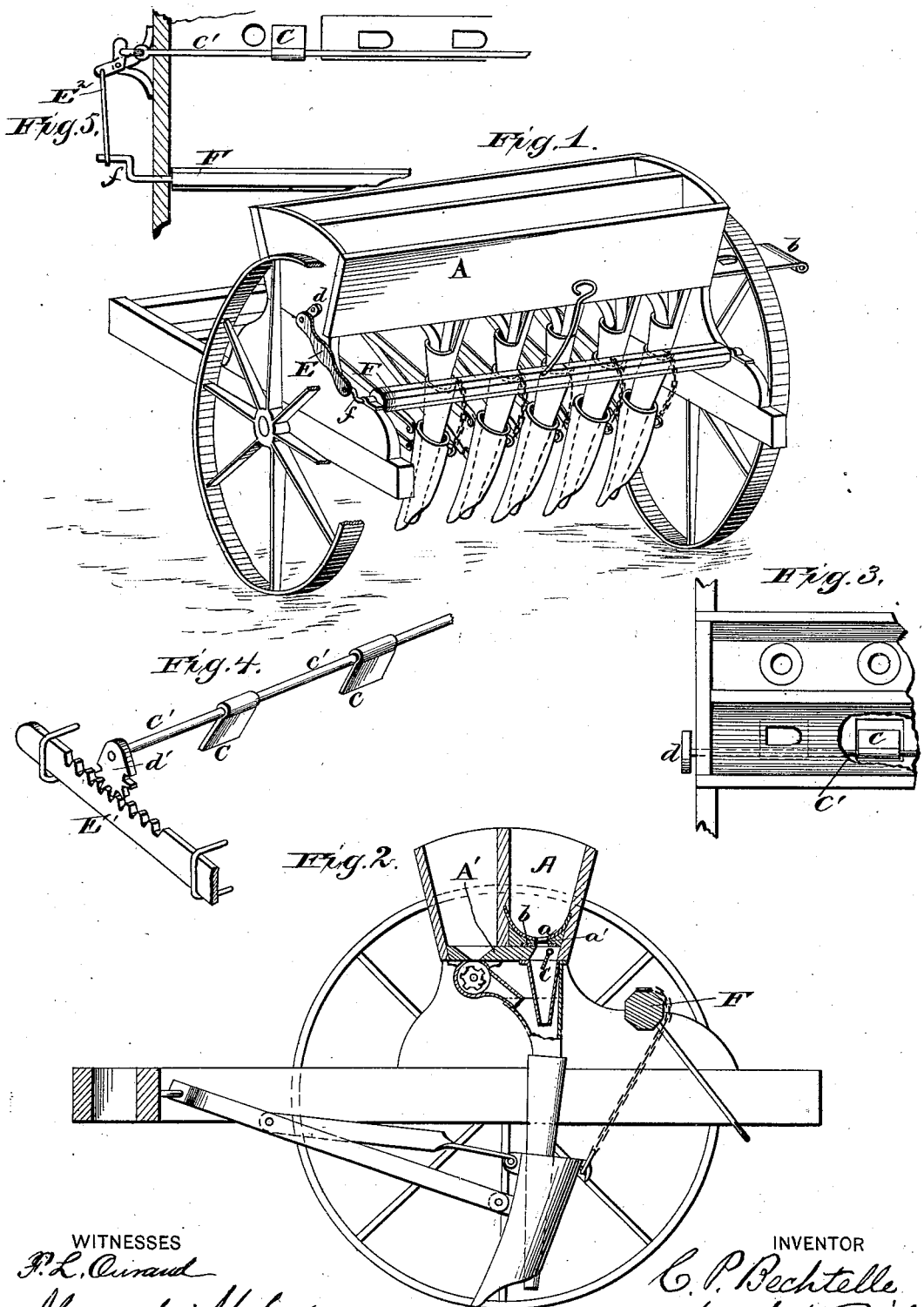
WITNESSES
INVENTOR
ATTORNEY

UNITED STATES PATENT OFFICE.

CHRISTIAN P. BECHTELLE, OF GREENCASTLE, PENNSYLVANIA, ASSIGNOR TO J. B. CROWELL & CO., OF SAME PLACE.

IMPROVEMENT IN FERTILIZER ATTACHMENTS TO GRAIN-DRILLS.

Specification forming part of Letters Patent No. 215,864, dated May 27, 1879; application filed April 11, 1879.

*To all whom it may concern:*

Be it known that I, CHRISTIAN P. BECHTELLE, of Greencastle, county of Franklin, State of Pennsylvania, have invented certain new and useful Improvements in Fertilizer Attachments to Grain-Drills, of which the following is a full, clear, and exact description, reference being had to the accompanying drawings, making part of this specification, in which—

Figure 1 is a perspective view of a grain-drill with my improvements applied. Fig. 2 represents a vertical longitudinal section through the same. Fig. 3 is a plan view of a portion of the hopper, partly broken away to show the arrangement of parts. Fig. 4 is a perspective view of the valve-shaft and valves, showing a modification in the devices for operating the same; and Fig. 5 shows a modification in the form of the valves, and also in the means for connecting them with the lifting-roller.

Similar letters of reference denote corresponding parts wherever used.

My invention relates to a novel means for stopping the discharge of the fertilizing material simultaneously with the lifting of the drill teeth or hoes out of the ground for transportation or other purpose; and consists in the employment of a series of valves connected with a rock-shaft, and adapted to be operated by the lifting roller or lever for automatically closing the discharge-apertures in the bottom of the fertilizer-hopper when the hoes are raised out of the ground, and for opening the same when the hoes are again lowered for operation, as hereinafter described.

The form of the fertilizer-hopper and the arrangement of parts shown in the accompanying drawings are similar to that described in the patent granted to J. B. Crowell June 23, 1863, No. 38,949, in which the hopper is provided with a concave metallic bottom and a vibrating wiper moving over the same for forcing the fertilizing material out through openings in said bottom; but it will be apparent that the improvements hereinafter described, while shown specially adapted to that arrangement, may be applied with equal advantage to other forms of hoppers having different arrangements of parts.

In the drawings, A represents the fertilizer-hopper, having the concave bottom $a$, with the openings $a'$ therein for the discharge of the fertilizing material, as explained. Underneath this concave bottom $a$, which is of thin metal, and between it and the wooden bottom $A'$, or within a longitudinal groove formed in the upper face of the latter, is arranged a slide, $b$, having a series of perforations corresponding in number and arrangement with those in the hopper-bottom. (See Fig. 1, where the slide is drawn partly out to show its construction.) By the adjustment of this slide the openings $a'$ in the concave bottom can be either opened to their full capacity or they can be partly or wholly closed, as desired, for regulating or stopping the discharge of the fertilizing material. Directly underneath this slide $b$, and within the discharge-openings in the wooden bottom $A'$, are arranged a series of valves, $c$, connected with a rock-shaft, $c^1$, (see Fig. 4,) mounted in a grooved bearing in the hopper-bottom A, or in other suitable bearings, as preferred. One end of this shaft $c^1$ projects through the end board or upright of the grain-box, and is provided with a crank-arm, $d$, (see Fig. 1,) or equivalent device, which is connected by a rod or pitman, E, with a corresponding crank-arm, $f$, on the end of the lifting-roller F, by means of which the drill tubes or hoes are raised and lowered.

The arrangement is such that when the roller F is rocked for raising the hoes out of the ground movement is imparted through the crank $f$ and rod E to the crank-arm $d$, rock-shaft $c^1$, and valves $c$, causing the latter to be rocked upward against the concave bottom $a$ or slide $b$, thus closing the discharge-opening $a'$ and stopping the discharge of the fertilizing material. The reverse movement of the lifting-roller for depressing the hoes into the ground opens the valves, and the flow or discharge of the fertilizing material is resumed.

The wooden bottom $A'$ of the hopper is made of thick material, and if the valves were placed outside of or below said bottom a considerable quantity of the fertilizing material would accumulate upon the valves within the discharge-opening in said bottom. For this reason it is preferred to arrange the valves at the upper ends of said openings, as shown and described.

A pinion or segment, $d^1$, may be applied to the shaft $c^1$ in lieu of the crank-arm $d$, and a sliding rack-bar, E', moving in guides, may be substituted in lieu of the pitman E, as shown in Fig. 4.

In Fig. 5 the valves for automatically closing the discharge-opening $a'$, instead of being connected with a rock-shaft, are shown connected with a sliding bar, $c^2$, which at its end is connected by a short link, $d^\times$, with one arm of a bell-crank lever, $d^2$, the other arm of which is connected by the pitman E with the lifting-roller, and serves, through the bell-crank lever, to reciprocate the rod $c^2$, and with it the valves $c$, for opening or closing the discharge-outlets $a'$, as required.

Instead of the link $d^\times$ a cam-slot may be formed in the arm of the lever connected with the valve-rod, and a pin on said rod entering said slot will serve to move the rod endwise when the bell-crank lever is vibrated by the movement of the lifting-roller.

Parts of the machine not particularly described, both as relates to the seeding devices and to the fertilizer attachment, may be constructed and arranged in any usual or preferred way.

Having now described my invention, what I claim as new, and desire to secure by Letters Patent, is—

1. The combination of valves attached to a rock-shaft for simultaneously opening or closing the discharge-outlets in the fertilizer-hopper with the lifting roller or lever for causing said valves to be automatically operated when the drill-tubes are raised and lowered, substantially as and for the purpose set forth.

2. The combination, with the perforated bottom of the fertilizer-hopper, of the perforated slide $b$ and flap-valves $c$, substantially as and for the purpose described.

3. The hopper-bottom provided with the discharge-outlets and with valves $c$, for closing the same when the drill-teeth are raised out of the ground, in combination with the rock-shaft $c^1$, for simultaneously operating said valves and closing the discharge-outlets, as described.

4. The rock-shaft $c^1$, to which the valves $c$ are attached, arranged in the described relation to the fertilizer-hopper, and provided with a crank-arm, $d$, or its equivalent, in combination with the rod or bar connecting it with the lifting-roller, for the purpose and substantially as described.

CHRISTIAN P. BECHTELLE.

Witnesses:
A. H. HUPERT,
I. MILTON EWERS.